(12) United States Patent
Yoshino

(10) Patent No.: US 8,184,360 B2
(45) Date of Patent: May 22, 2012

(54) WAVELENGTH CONVERTING DEVICES

(75) Inventor: Takashi Yoshino, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 164 days.

(21) Appl. No.: 12/713,770

(22) Filed: Feb. 26, 2010

(65) Prior Publication Data

US 2010/0226002 A1    Sep. 9, 2010

(30) Foreign Application Priority Data

Mar. 6, 2009 (JP) ................. 2009-052901

(51) Int. Cl.
   *G02F 1/37*  (2006.01)
(52) U.S. Cl. .................. 359/328; 359/332
(58) Field of Classification Search .......... 359/326–332; 372/21–22; 385/122, 129–132
See application file for complete search history.

(56) References Cited

U.S. PATENT DOCUMENTS

| | | | |
|---|---|---|---|
| 5,424,867 A * | 6/1995 | Nihei et al. .......... | 359/326 |
| 7,171,094 B2 * | 1/2007 | Mizuuchi et al. ........ | 385/129 |
| 2004/0233512 A1 * | 11/2004 | Fujioka et al. .......... | 359/326 |
| 2005/0284359 A1 | 12/2005 | Hotta et al. | |
| 2006/0001948 A1 | 1/2006 | Noda et al. | |
| 2006/0120415 A1 | 6/2006 | Iwai et al. | |
| 2007/0189689 A1 | 8/2007 | Yamaguchi et al. | |
| 2007/0223081 A1 * | 9/2007 | Yoshino et al. ....... | 359/326 |
| 2009/0230817 A1 | 9/2009 | Kurachi et al. | |
| 2009/0231680 A1 | 9/2009 | Yoshino | |

FOREIGN PATENT DOCUMENTS

| | | |
|---|---|---|
| JP | 2004-254114 A1 | 9/2004 |
| JP | 2004-295088 A1 | 10/2004 |
| JP | 2005-055528 A1 | 3/2005 |
| JP | 2005-314137 A1 | 11/2005 |
| JP | 2007-241078 A1 | 9/2007 |
| JP | 2008-065140 A1 | 3/2008 |
| JP | 2008-102228 A1 | 5/2008 |
| JP | 2008-224972 A1 | 9/2008 |
| JP | 2009-217009 A1 | 9/2009 |
| JP | 2009-217133 A1 | 9/2009 |
| WO | 2006/041172 A1 | 4/2006 |
| WO | 2007/046176 A1 | 4/2007 |
| WO | 2009/107473 A1 | 9/2009 |

OTHER PUBLICATIONS

U.S. Appl. No. 12/709,754, filed Feb. 22, 2010, Yoshino, Takashi.

* cited by examiner

*Primary Examiner* — Daniel Petkovsek
(74) *Attorney, Agent, or Firm* — Burr & Brown

(57) ABSTRACT

A harmonic wave oscillating device having a supporting body, a wavelength converting layer, a lower side adhesive layer that adheres the wavelength converting layer and the supporting body, an upper side substrate provided on the side of an upper face of the wavelength converting layer, and an upper side adhesive layer that adheres the wavelength converting layer and the upper side substrate. The wavelength converting layer is made of a ferroelectric single crystal and has a channel type optical waveguide with a periodic polarization inversion structure formed therein. The wavelength converting layer has a width of 1.5 mm or smaller when viewed in a direction parallel to the wavelength converting layer and perpendicular to light propagating in the optical waveguide, and at least one of the supporting body and the upper side substrate has a volume resistivity lower than that of the ferroelectric single crystal.

9 Claims, 2 Drawing Sheets

WAVELENGTH CONVERTING DEVICES

This application claims the benefit of Japanese Patent Application P 2009-52901 filed on Mar. 6, 2009, the entirety of which is incorporated by reference.

BACKGROUND OF THE INVENTION

1. Technical Field of the Invention

The present invention relates to a wavelength converting device of a Quasi-Phase-Matched (QPM) Secondary-Harmonic-Generation system.

2. Related Art

Non-linear optical crystals, such as a lithium niobate single crystal and a lithium tantalate single crystal, have a high secondary non-linear optical constant. A periodic polarization inversion configuration can be formed in the crystal to produce a Quasi-Phase-Matched (QPM) Secondary-Harmonic-Generation (SHG) device. Further, an optical waveguide may be formed in the periodic polarization inversion configuration to produce a high efficient SHG device, leading to a wide variety of applications in optical communication, medical, photochemical and various optical measurement fields.

According to a harmonic wave oscillating device described in WO 2006/41172 A1, a thin plate of a ferroelectric single crystal is adhered onto a supporting body, and an upper side substrate is adhered thereon through a buffer layer and adhesive layer. A channel optical waveguide is formed in the thin plate. A periodic domain inversion structure is formed in the optical waveguide to convert the wavelength of a fundamental wave incident into the optical waveguide to oscillate a harmonic wave therefrom.

Further, Japanese patent publication No. 2004-254114A describes the technique of applying oxygen-deficient lithium niobate single crystal to lower its volume resistivity.

Japanese patent publication No. 2005-314137A describes applying Fe-doped lithium niobate to lower the volume resistivity.

SUMMARY OF THE INVENTION

It is necessary for a harmonic wave oscillating device such as SHG oscillating device to operate stably even when it is subjected to repeated changes of temperature. It is further necessary to reduce the device size. However, when the width of the device as described in WO 2006/41172 A1 is reduced to 1.5 mm or smaller, it is proven that the wavelength conversion efficiency would be deteriorated, particularly after the device is subjected to thermal cycles between minus 40° C. to plus 80° C.

The inventor collected and observed such devices with the deterioration of the wavelength conversion efficiency, and found the deterioration of the periodic domain inversion structure thereof. It is further proved that such deterioration is characteristic to the devices having the ferroelectric thin plate sandwiched by the supporting body and lower side substrate, as described in WO 2006/41172 A1.

The inventor filed Japanese patent application No. 2008-62539 and disclosed the technique of forming a conductive film on an adhesion face of an upper side substrate to prevent the reduction of the wavelength conversion efficiency due to the deterioration of the periodic domain inversion structure. According to the method, however, it is typically necessary to form the conductive metal film on the adhesion face of the upper side substrate by sputtering. The number of required manufacturing steps and the production costs are thereby increased.

An object of the present invention is to provide a novel miniaturized harmonic wave oscillating device having a supporting substrate, an upper side substrate and a wavelength converting layer provided therebetween, in which the wavelength converting layer has a channel optical waveguide with a periodic domain inversion structure formed therein. Specifically, the invention aims at preventing the reduction of wavelength conversion efficiency due to the deterioration of the periodic domain inversion structure without the need of a film-forming step such as sputtering.

The present invention provides a harmonic wave oscillating device that includes a supporting body, a wavelength converting layer including a ferroelectric single crystal and a channel type optical waveguide with a periodic polarization inversion structure formed therein, a lower side adhesive layer adhering the wavelength converting layer and the supporting body, an upper side substrate provided on the side of an upper face of the wavelength converting layer and an upper side adhesive layer adhering the wavelength converting layer and the upper side substrate. The wavelength converting layer has a width of 1.5 mm or smaller when viewed in a direction perpendicular to light propagating direction in the optical waveguide, and at least one of the supporting body and the upper side substrate comprises a material having a volume resistivity lower than that of the ferroelectric single crystal.

The present inventor tried to produce a harmonic wave oscillating device having a supporting body, an upper side substrate and a wavelength converting layer provided between them and having a channel type optical waveguide with a periodic polarization inversion formed therein. As a result, the inventor found that, as the width of the wavelength converting layer is reduced to 1.5 mm or smaller, the wavelength conversion efficiency is lowered after the device is subjected to temperature cycles.

Then, the thin plate of the harmonic wave oscillating device is subjected to etching and its periodic polarization inversion structure is observed. As a result, it is proved that the periodic polarization inversion structure is deteriorated or locally missing. It is found that these defects result in the reduction of the wavelength conversion efficiency.

The inventor further investigated the cause of the deterioration of the periodic polarization inversion structure, and found that the deterioration is caused by pyroelectricity between both side faces of the device. That is, as the width of the device becomes smaller, the deterioration of the polarization inversion structure tends to be caused. Based on this discovery, it is found that the reduction of the wavelength conversion efficiency after thermal cycling can be prevented, by making at least one of the upper side substrate and supporting body of a material having a low resistance.

Further, the inventor tried to form a conductive adhesive layer for adhering the supporting body and the wavelength converting layer to thereby prevent the deterioration of the periodic polarization inversion structure due the pyroelectric effects. In actuality, however, thermal loss is increased in the conductive adhesive layer so that the adhesive layer is burned in a subsequent step, such as an optical axis adjustment step. Therefore, the provision or use of the conductive adhesive layer is not sufficient for solving the above problems.

DETAILED DESCRIPTION OF THE INVENTION

Figure 1:
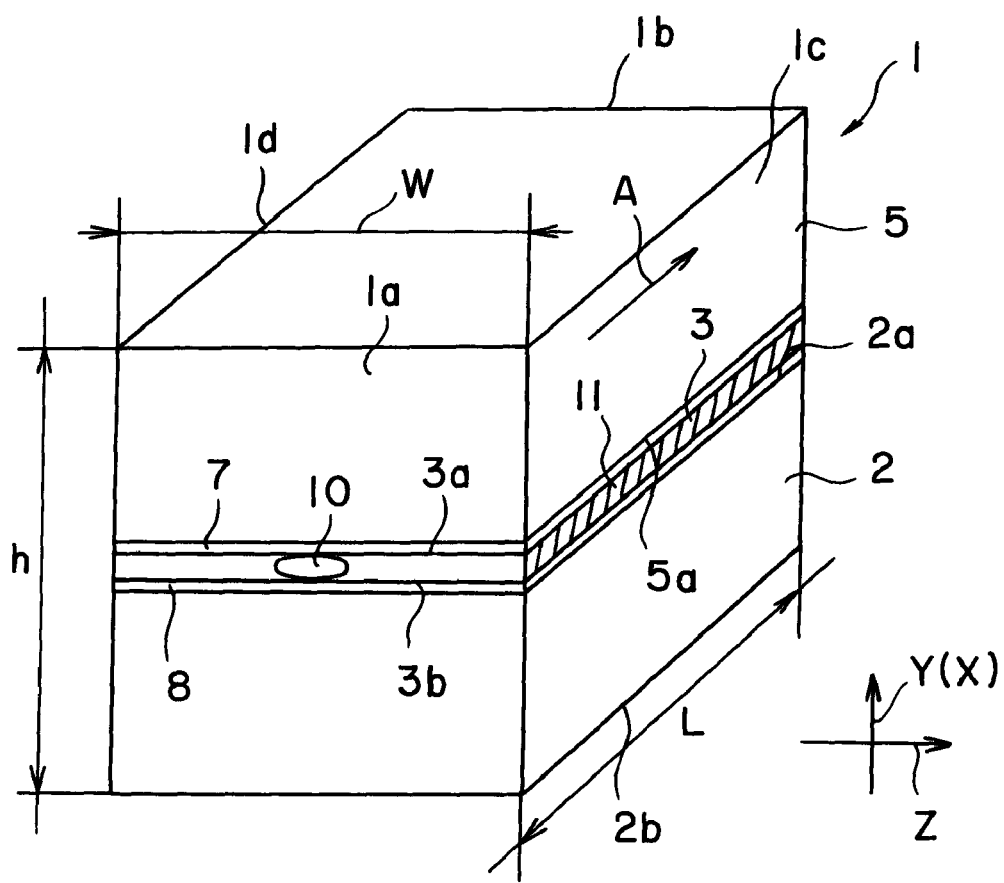
FIG. 1 is a perspective view schematically showing a harmonic wave oscillating device 1.
Figure 2:
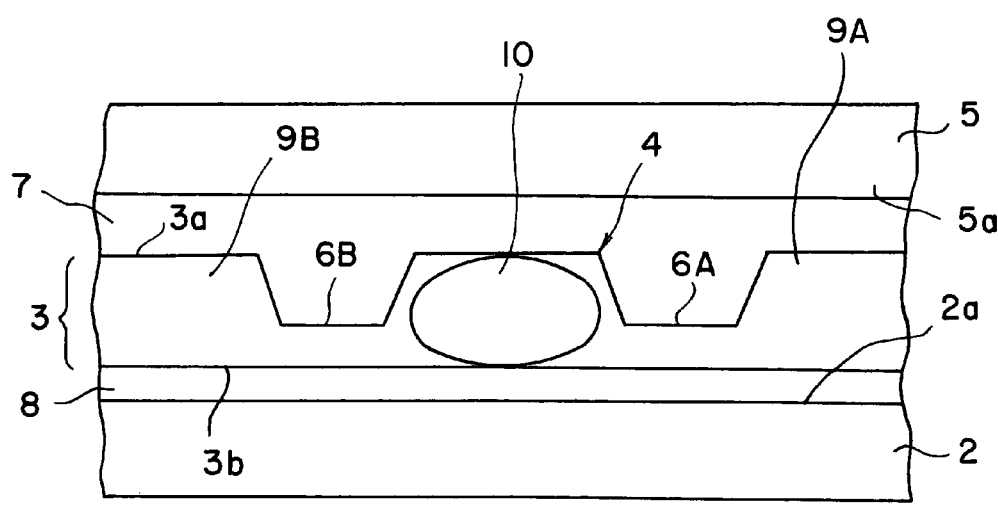
FIG. 2 is an enlarged view showing a channel optical waveguide of the device 1 and its neighboring part.
Figure 2:
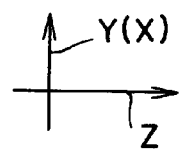

FIG. 1 is a perspective view schematically showing a harmonic wave oscillating device 1. FIG. 2 is an enlarged view showing a channel optical waveguide 10 of the device 1 and its neighboring parts.

As shown in FIGS. 1 and 2, a pair of elongate grooves 6A and 6B are provided in a wavelength converting layer 3 made of an X-plate (Y plate, or offset X-plate, offset Y-plate) of a ferroelectric single crystal. The grooves 6A and 6B are parallel with each other to together form a ridge portion 4. The ridge portion 4 and grooves 6A and 6B together form a channel type optical waveguide 10. Extended portions 9A and 9B are formed on the outer sides of the grooves 6A and 6B, respectively, to form a thin plate.

In the case of a X-plate (Y-plate), the horizontal direction shown in FIGS. 1 and 2 is Z direction, and the ferroelectric single crystal is polarized in the Z direction. The X axis (Y axis) perpendicular to an upper face 3a of the wavelength converting layer 3. In the case of the offset X-plate and Y-plate, the X axis (Y axis) is inclined to a plane perpendicular to the upper face 3a of the wavelength converting layer 3. The angle of inclination may preferably be 10° or smaller on the viewpoint of the present invention.

It is polarized in the channel optical waveguide 10 in the Z direction perpendicular to the direction of light propagation to form a periodic domain inversion structure 11. As a result, fundamental wave is incident into an incident face 1a of the device 1 and subjected to wavelength conversion in the optical waveguide 10, so that the resulting harmonic wave is emitted from an emitting face 1b of the device 1.

A bottom face 3b of the wavelength converting layer 3 is adhered to an upper face 2a of a separate substrate 2 through a lower side adhesive layer 8. The upper face 3a of the wavelength converting layer 3 is adhered to a bottom face 5a of a separate upper side substrate 5 through an upper side adhesive layer 7. 1c and 1d represent a pair of side faces between the incident face 1a and emitting face 1b, respectively. The side faces 1c and 1d oppose each other. A buffer layer may be provided on the upper face or bottom face of the wavelength converting layer.

As the width "W" of the wavelength converting layer 3 (the width in the direction perpendicular to the direction "A" of light propagation and parallel with the upper face 3a) is 1.5 mm or smaller, it is proved that the periodic polarization inversion structure formed in the channel optical waveguide 10 is deteriorated. This results in the reduction of wavelength conversion efficiency.

The inventor reached the idea of producing one or both of the supporting body and upper side substrate with a material having a volume resistivity lower than that of the single crystal forming the wavelength converting layer. It is thus possible to prevent the reduction of the wavelength conversion efficiency after the device is subjected to thermal cycles.

According to the present invention, the width "W" of the wavelength converting layer (width in the direction perpendicular to the direction "A" of light propagation) is 1.5 mm or smaller. Further, although the height "h" of the device is limited, the invention is most effective in the case that the height is 1.0 mm or smaller. Further, although the length "L" of the device (dimension in the direction "A" of light propagation) is not limited, the invention is most effective in the case that the length "L" is 12 mm or smaller.

Although the thickness of the upper side and lower side substrates is not particularly limited, the thickness may preferably be 100 µm or larger on the above viewpoint. Further, the upper limit of the thickness of the supporting body and upper side substrate is not particularly limited, and may preferably be 2 mm or smaller in a practical view.

According to a preferred embodiment, the volume resistivity of at least one of the upper side substrate and supporting body is 1/100 or smaller, and more preferably 1/500 or smaller, of the volume resistivity of the single crystal forming the wavelength converting layer.

Further, according to a preferred embodiment, the volume resistivity of at least one of the upper side substrate and the supporting body is $1 \times 10^{12}$ Ω·cm or lower (more preferably $1 \times 10^{11}$ Ω·cm or lower). And the volume resistivity of the single crystal forming the wavelength converting layer may preferably be $2 \times 10^{12}$ Ω·cm or higher (more preferably $1 \times 10^{13}$ Ω·cm or higher).

According to a preferred embodiment, at least one of the upper side substrate and the supporting body is made of an oxygen deficient ferroelectric single crystal. For producing an oxygen deficient ferroelectric single crystal to lower the volume resistivity, the single crystal is heat treated under reducing atmosphere (preferably hydrogen atmosphere) preferably at 200 to 1000° C.

Further, according to a preferred embodiment, at least one of the upper side substrate and the supporting body is made of a ferroelectric single crystal doped with iron. For doping iron atoms into the single crystal, an iron compound is added while growing the single crystal in advance. Such an iron compound includes $Fe_2O_3$.

Further, according to a preferred embodiment, the single crystal forming the wavelength conversion layer is selected from the group consisting of lithium niobate, lithium tantalite and lithium niobate-lithium tantalite solid solution. And the lower resistance single crystal forming at leasione of the upper side substrate and the supporting body is selected from the group consisting of lithium niobate, lithium tantalite and lithium niobate-lithium tantalite solid solution. In the case that one of the upper side substrate and the supporting body is not made of the lower resistance single crystal, it may preferably be selected from the group consisting of lithium niobate, lithium tantalite and lithium niobate-lithium tantalite solid solution.

Further, the material of the wavelength conversion layer may preferably be $K_3Li_2Nb_5O_{15}$ or $La_3Ga_5SiO_{14}$.

The volume resistivity of the material forming the wavelength conversion layer may preferably be $1 \times 10^{14}$ Ω·cm or lower in a practical view. Further, the volume resistivity of the material forming the upper side substrate or the supporting body may preferably be $1 \times 10^{10}$ Ω·cm or higher in a practical view.

According to a preferred embodiment, a difference of the thermal expansion coefficient of the single crystal forming the wavelength conversion layer and that of the upper side substrate or that of the supporting body is 10 percent or less of the thermal expansion coefficient of the single crystal forming the wavelength conversion layer. By reducing the difference of thermal expansion coefficient, it is possible to prevent the fluctuation or reduction of the emission efficiency when subjected to thermal cycles or temperature change.

The thickness of the upper side adhesive layer and the thickness of the lower side adhesive layer may preferably be 5 µm or less, and more preferably be 1 µm or less, on the viewpoint of preventing the reduction of the wavelength conversion efficiency due to the pyroelectricity. Further, the thickness of the upper side adhesive layer and that of the lower side adhesive layer may preferably be 0.1 µm or more and more preferably be 0.3 µm or more.

The type of the channel optical waveguide in the wavelength converting layer is not limited, and may be a ridge or diffusion type optical waveguide. The diffusion type optical waveguide may be formed by metal diffusion (for example titanium diffusion) or proton exchange. The processing for forming the ridge optical waveguide is not limited and includes machining, ion milling, dry etching and laser ablation.

The material of the adhesive layer for adhering the wavelength conversion layer to the supporting body or the upper side substrate may be an inorganic adhesive, an organic adhesive, or the combination thereof.

Although the organic adhesive is not particularly limited, and it includes epoxy adhesive, acrylic adhesive, a thermosetting adhesive, ultraviolet curing adhesive, and ALON ceramics C (Trade name supplied by Toa Gosei Ltd.) (thermal expansion coefficient of $13 \times 10^{-6}$/K) having a thermal expansion coefficient relatively close to that of a material exhibiting electrooptical effect such as lithium niobate.

It is further preferred that the inorganic adhesive has a lower dielectric constant and an adhesion temperature (working temperature) of 600° C. or lower. Further, the adhesive preferably has a sufficiently high adhesion strength during the processing. Specifically, the adhesive includes a glass, wherein one or plural components of silicon oxide, lead oxide, aluminum oxide, magnesium oxide, calcium oxide, niobium pentoxide, zinc oxide and boron oxide are combined. Another inorganic adhesive includes tantalum pentoxide, titanium oxide, niobium pentoxide and zinc oxide.

The production method of the inorganic adhesion layer is not particularly limited, and includes sputtering, vapor deposition, spin coating, and sol-gel process.

Further, a sheet of an adhesive may be interposed between the wavelength converting layer 3 and supporting body 2 or the upper side substrate 5 to join them. Preferably, a sheet of a thermal setting, light curing or light thickening adhesive is interposed between the wavelength converting layer 3 and supporting body 2 or upper side substrate and then cured. Such a sheet may appropriately be a film resin having a thickness of 10 µm or less.

EXAMPLES

Example 1

The second harmonic wave oscillating device 1 illustrated in FIGS. 1 and 2 was produced.

Specifically, a periodic domain inversion structure 11 with a period of 6.7 µm was formed on an MgO 5% doped lithium niobate-5 degree offcut Y substrate of 0.5 mm thick. An adhesive was applied on a non-doped lithium niobate substrate 2 having a thickness of 0.5 mm, which was then adhered onto the above MgO doped lithium niobate substrate. The surface of the MgO-doped lithium niobate substrate was then ground and polished to a thickness of 3.7 µm. A ridge type optical waveguide 10 was formed on the thus obtained MgO-doped lithium niobate substrate by laser ablation. After that, an under clad (buffer layer) with a thickness of 0.5 µm was formed thereon by sputtering.

The material of the non doped lithium niobate substrate 2 has a volume resistivity of $1.5 \times 10^{14}$ Ω·cm, and the material of the MgO doped lithium niobate substrate has a volume resistivity of $5.0 \times 10^{13}$ Ω·cm.

The upper side substrate 5 having a thickness of 0.5 mm and made of a low resistance lithium niobate (a volume resistivity of $2 \times 10^{10}$ Ω·cm) was joined with the over clad of the wavelength converting layer with an adhesive 7. The joined body was cut by a dicer to a length "L" of 9 mm, a width "W" of 1.5 mm and a height "h" of 1.0 mm, and the end faces were polished. Anti-reflection films were then formed on the end faces.

Nd-YAG laser was used in the optical waveguide to measure the optical characteristics. That is, the oscillation power of the laser was adjusted at 500 mW to provide a fundamental light, which was incident into the optical waveguide through a lens. It was thus proved that an SHG output power of 160 mW was observed. The wavelength of the fundamental light was 1064.3 nm.

A thermal cycle test of −40° C./80° C. was performed using the above device. After 500 thermal cycles, the SHG output power of the device was measured to prove that the deterioration of the optical characteristics was not observed.

Example 2

The device same as the Example 1 was produced. However, in the step of cutting the device with a dicer, the length "L", width "W" and height "h" of the device were adjusted to 9 mm, 1.0 mm and 1 mm, respectively.

The optical characteristics were measured to prove that an output power of 155 mW was obtained at an input power of 500 mW. The thermal cycle test of −40° C./80° C. was performed. After 500 thermal cycles, the SHG output power was measured to prove that the reduction of SHG output power was not observed.

Example 3

The device same as the Example 1 was produced. However, the upper side substrate 5 was made of a low resistance lithium niobate having a volume resistivity of $5 \times 10^{11}$ Ω·cm. In the step of cutting the device with a dicer, the length "L", width "W" and height "h" of the device were adjusted to 9 mm, 1.5 mm and 1 mm, respectively.

The optical characteristics were measured to prove that an output power of 165 mW was obtained at an input power of 500 mW. The thermal cycle test of −40° C./80° C. was performed. After 500 thermal cycles, the SHG output power was measured to prove that the reduction of SHG output power was not observed.

Comparative Example 1

A periodic domain inversion structure 11 with a period of 6.7 µm was formed on an MgO 5% doped lithium niobate-5 degree offcut Y substrate of 0.5 mm thick. An adhesive was applied on a Z-cut low resistance lithium niobate substrate 8 of a thickness of 0.5 mm, which was then adhered to the above MgO-doped lithium niobate substrate. An adhesive was applied on a non-doped lithium niobate substrate having a thickness of 0.5 mm, which was then adhered onto the above MgO doped lithium niobate substrate. The surface of the MgO-doped lithium niobate substrate was then ground and polished to a thickness of 3.7 µm. A ridge type optical waveguide was formed on the thus obtained substrate by laser ablation. After that, an under clad (buffer layer) with a thickness of 0.5 µm was formed thereon by sputtering.

The material of the non doped lithium niobate substrate 2 has a volume resistivity of $1.5 \times 10^{14}$ Ω·cm, and the material of the MgO doped lithium niobate substrate has a volume resistivity of $5 \times 10^{13}$ Ω·cm.

The upper side substrate 5 having a thickness of 0.5 mm and made of a non-doped lithium niobate (a volume resistivity of $1.5 \times 10^{14}$ Ω·cm) was joined with the over clad of the wavelength converting layer with an adhesive 7. The joined body was cut by a dicer to a length "L" of 9 mm, a width "W" of 1.5 mm and a height "h" of 1.0 mm, and the end faces were polished. Anti-reflection films were then formed on the end faces.

Nd-YAG laser was used in the optical waveguide to measure the optical characteristics. That is, the oscillation power of the laser was adjusted at 500 mW to provide a fundamental light, which was incident into the optical waveguide through a lens. It was thus proved that an SHG output power of 160 mW was observed. The wavelength of the fundamental light was 1064.3 nm.

A thermal cycle test of −40° C./80° C. was performed using the above device. After 100 thermal cycles, the SHG output power of the device was measured to prove that the SHG output power was reduced to 100 mW. Further, after 200 cycles, the SHG output power was reduced to 20 mW. The device with the SHG output power reduced was polished and the cross section of the optical waveguide was etched to observe the shape of the polarization inversion structure. It was thus proved that 80 percent of the polarization inversion structure disappeared.

Comparative Example 2

The device same as the Comparative Example 1 was produced. However, at the step of cutting out the device with a dicer, the length "L", width "W" and height "h" of the device were set at 9 mm, 1.0 mm and 1 mm, respectively.

The optical characteristic of the device was measured and an output power of 160 mW was obtained at an input power of 500 mW. A thermal cycle test of −40° C./80° C. was performed using the device. After 100 thermal cycles, the SHG output power of the device was measured to prove that the SHG output power was reduced to 10 mW. The device with the SHG output power reduced was polished and the cross section of the optical waveguide was etched to observe the shape of the polarization inversion structure. It was thus proved that 80 percent of the polarization inversion structure disappeared.

Comparative Example 3

The device same as the Comparative Example 1 was produced. However, at the step of cutting out the device with a dicer, the length "L", width "W" and height "h" of the device were set at 9 mm, 1.7 mm and 1 mm, respectively.

The optical characteristic of the device was measured and an output power of 160 mW was obtained at an input of 500 mW. A thermal cycle test of −40° C./80° C. was performed using the device. After 500 thermal cycles, the SHG output power of the device was measured to prove that the reduction of the SHG output power was not observed.

Reference Numerals

1 Harmonic wave oscillating device
1a Incident face 1b Outgoing face
2 Supporting body 3 Wavelength converting layer
4 Ridge portion 5 Upper side substrate
7 Upper side adhesive layer
8 Lower side adhesive layer
10 Optical waveguide
11 Periodic domain inversion structure
A Direction of light propagation
W Width of device

The invention claimed is:

1. A harmonic wave oscillating device comprising:
a supporting body;
a wavelength converting layer comprising a ferroelectric single crystal and a channel optical waveguide with a periodic polarization inversion structure formed therein;
a lower side adhesive layer adhering the wavelength converting layer and the supporting body;
an upper side substrate provided on the side of an upper face of the wavelength converting layer; and
an upper side adhesive layer adhering the wavelength converting layer and the upper side substrate;
wherein the wavelength converting layer has a width of 1.5 mm or smaller when viewed in a direction parallel to the wavelength converting layer and perpendicular to light propagating in the optical waveguide, and
wherein at least one of the supporting body and the upper side substrate comprises a material having a volume resistivity lower than that of the ferroelectric single crystal.

2. The device of claim 1, wherein at least one of the upper side substrate and the supporting body has a volume resistivity of $1/100$ less of the volume resistivity of the ferroelectric single crystal.

3. The device of claim 2, wherein the volume resistivity of at least one of the upper side substrate and the supporting body is $1 \times 10^{11}$ Ω·cm or lower, and wherein the volume resistivity of the ferroelectric single crystal is $1 \times 10^{13}$ Ω·cm or higher.

4. The device of claim 1, wherein at least one of the upper side substrate and the supporting body comprises an oxygen-deficient ferroelectric single crystal.

5. The device of claim 4, wherein the single crystal forming the wavelength converting layer is selected from the group consisting of lithium niobate, lithium tantalite and lithium niobate-lithium tantalite solid solution, and wherein the single crystal forming at least one of the upper side substrate and the supporting body is selected from the group consisting of lithium niobate, lithium tantalite and lithium niobate-lithium tantalite solid solution.

6. The device of claim 1, wherein at least one of the upper side substrate and the supporting body comprises an iron-doped ferroelectric single crystal.

7. The device of claim 6, wherein the single crystal forming the wavelength converting layer is selected from the group consisting of lithium niobate, lithium tantalite and lithium niobate-lithium tantalite solid solution, and wherein the single crystal forming at least one of the upper side substrate and the supporting body is selected from the group consisting of lithium niobate, lithium tantalite and lithium niobate-lithium tantalite solid solution.

8. The device of claim 1, wherein a difference of the thermal expansion coefficient of the single crystal forming the wavelength converting layer and that of the upper side substrate is 10 percent or less of the thermal expansion coefficient of the single crystal forming the wavelength converting layer.

9. The device of claim 1, wherein a difference of the thermal expansion coefficient of the single crystal forming the wavelength converting layer and that of the supporting body is 10 percent or less of the thermal expansion coefficient of the single crystal forming the wavelength converting layer.

* * * * *

UNITED STATES PATENT AND TRADEMARK OFFICE
CERTIFICATE OF CORRECTION

PATENT NO.       : 8,184,360 B2  
APPLICATION NO.  : 12/713770  
DATED            : May 22, 2012  
INVENTOR(S)      : Takashi Yoshino Page 1 of 1

It is certified that error appears in the above-identified patent and that said Letters Patent is hereby corrected as shown below:

Column 8

*Line 24*: please add --or-- after "1/100"

Signed and Sealed this  
Tenth Day of July, 2012

David J. Kappos  
*Director of the United States Patent and Trademark Office*